United States Patent
Mitsumasu

(10) Patent No.: US 10,324,833 B2
(45) Date of Patent: Jun. 18, 2019

(54) MEMORY CONTROLLER, DATA STORAGE DEVICE, AND MEMORY CONTROL METHOD

(71) Applicant: TOSHIBA MEMORY CORPORATION, Tokyo (JP)

(72) Inventor: Yosuke Mitsumasu, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 227 days.

(21) Appl. No.: 15/252,105

(22) Filed: Aug. 30, 2016

(65) Prior Publication Data

US 2017/0115932 A1    Apr. 27, 2017

Related U.S. Application Data

(60) Provisional application No. 62/246,720, filed on Oct. 27, 2015.

(51) Int. Cl.
*G06F 12/02* (2006.01)

(52) U.S. Cl.
CPC .. *G06F 12/0246* (2013.01); *G06F 2212/7202* (2013.01); *G06F 2212/7203* (2013.01); *G06F 2212/7205* (2013.01)

(58) Field of Classification Search
CPC ... G06F 3/0679; G06F 3/0688; G06F 12/0246
See application file for complete search history.

(56) References Cited

U.S. PATENT DOCUMENTS

| | | | |
|---|---|---|---|
| 7,203,114 B2 | 4/2007 | Okuyama | |
| 7,742,356 B2 | 6/2010 | Dono et al. | |
| 8,724,415 B2 | 5/2014 | Kuroda | |
| 2006/0161724 A1* | 7/2006 | Bennett | G06F 12/0246 711/103 |
| 2006/0161728 A1* | 7/2006 | Bennett | G06F 12/0246 711/103 |
| 2008/0294814 A1* | 11/2008 | Gorobets | G11C 16/349 710/62 |

(Continued)

FOREIGN PATENT DOCUMENTS

| | | |
|---|---|---|
| JP | 2006351066 A | 12/2006 |
| JP | 2011170943 A | 9/2011 |

(Continued)

*Primary Examiner* — Edward J Dudek, Jr.
*Assistant Examiner* — Andrew Russell
(74) *Attorney, Agent, or Firm* — Kim & Stewart LLP

(57) ABSTRACT

A memory control device includes a host interface, a memory interface, and a controller configured to control the memory interface to output data to a non-volatile semiconductor memory for writing therein. The data include first data that the host interface received from a host, second data read out from the non-volatile semiconductor memory for memory refresh, and third data read out form the non-volatile semiconductor memory for garbage collection. When the memory refresh is not carried out, the controller adjusts a ratio of the first data with respect to the third data to be a first value. When the memory refresh is carried out, the controller calculates a second value based on the first value, and adjusts a ratio of the first data with respect to a total of the second data and the third data to be the second value.

17 Claims, 10 Drawing Sheets

(56) References Cited

U.S. PATENT DOCUMENTS

| | | | |
|---|---|---|---|
| 2009/0006719 A1* | 1/2009 | Traister | G06F 12/0246 711/103 |
| 2012/0221773 A1 | 8/2012 | Shuto et al. | |
| 2013/0024641 A1* | 1/2013 | Talagala | G06F 11/3485 711/170 |
| 2014/0181370 A1* | 6/2014 | Cohen | G06F 12/0246 711/103 |
| 2016/0188219 A1* | 6/2016 | Peterson | G06F 3/0616 711/103 |

FOREIGN PATENT DOCUMENTS

| | | |
|---|---|---|
| JP | 2012178194 A | 9/2012 |
| JP | 2013004158 A | 1/2013 |

* cited by examiner

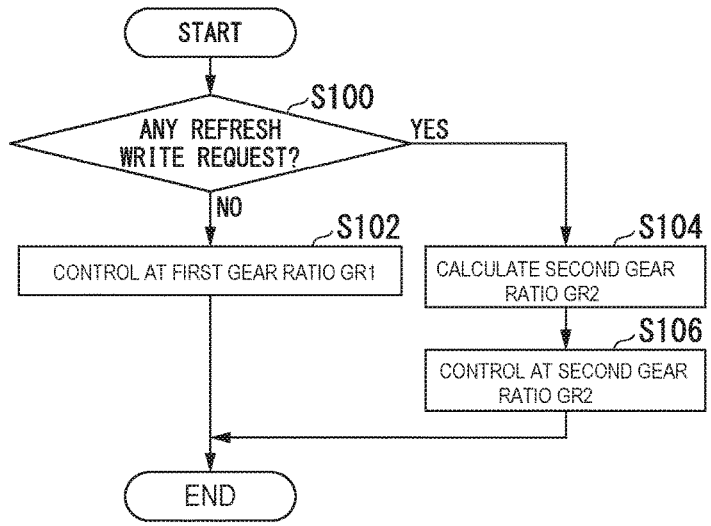

MEMORY CONTROLLER, DATA STORAGE DEVICE, AND MEMORY CONTROL METHOD

CROSS-REFERENCE TO RELATED APPLICATIONS

This application is based upon and claims the benefit of priority from U.S. Provisional Patent Application No. 62/246,720, filed on Oct. 27, 2015, the entire contents of which are incorporated herein by reference.

FIELD

Embodiments described herein relate generally to a memory controller, a data storage device, and a memory control method.

BACKGROUND

A data storage device including a non-volatile semiconductor memory such as a solid state drive (SSD) carries out a refresh write process (memory refresh) to prevent data loss. The refresh write process is a process of writing at least all valid data stored in a target block of the non-volatile semiconductor memory into a different block thereof.

The refresh write process may be carried out with higher priority over other processes to shorten time to be completed the refresh write process. However, if a controller of the data storage device performs the refresh write process without any limitations or restrictions, then latency with respect to data writing requests from a host may increase.

BRIEF DESCRIPTION OF THE DRAWINGS

FIG. 2 illustrates a block management table stored in a data buffer.

FIG. 3 illustrates a flowchart of a process executed by a gear ratio control section of the data storage device.

FIG. 4 illustrates an address management table stored in the data buffer.

DETAILED DESCRIPTION

A memory controller according to embodiments includes a host interface, a memory interface, and a controller configured to control the memory interface to output data to a non-volatile semiconductor memory for writing therein. The data include first data that the host interface received from a host, second data read out from the non-volatile semiconductor memory for memory refresh, and third data read out form the non-volatile semiconductor memory for garbage collection. When the memory refresh is not carried out, the controller adjusts a ratio of the first data with respect to the third data to be a first value. When the memory refresh is carried out, the controller calculates a second value based on the first value, and adjusts a ratio of the first data with respect to a total of the second data and the third data to be the second value.

Figure 1:
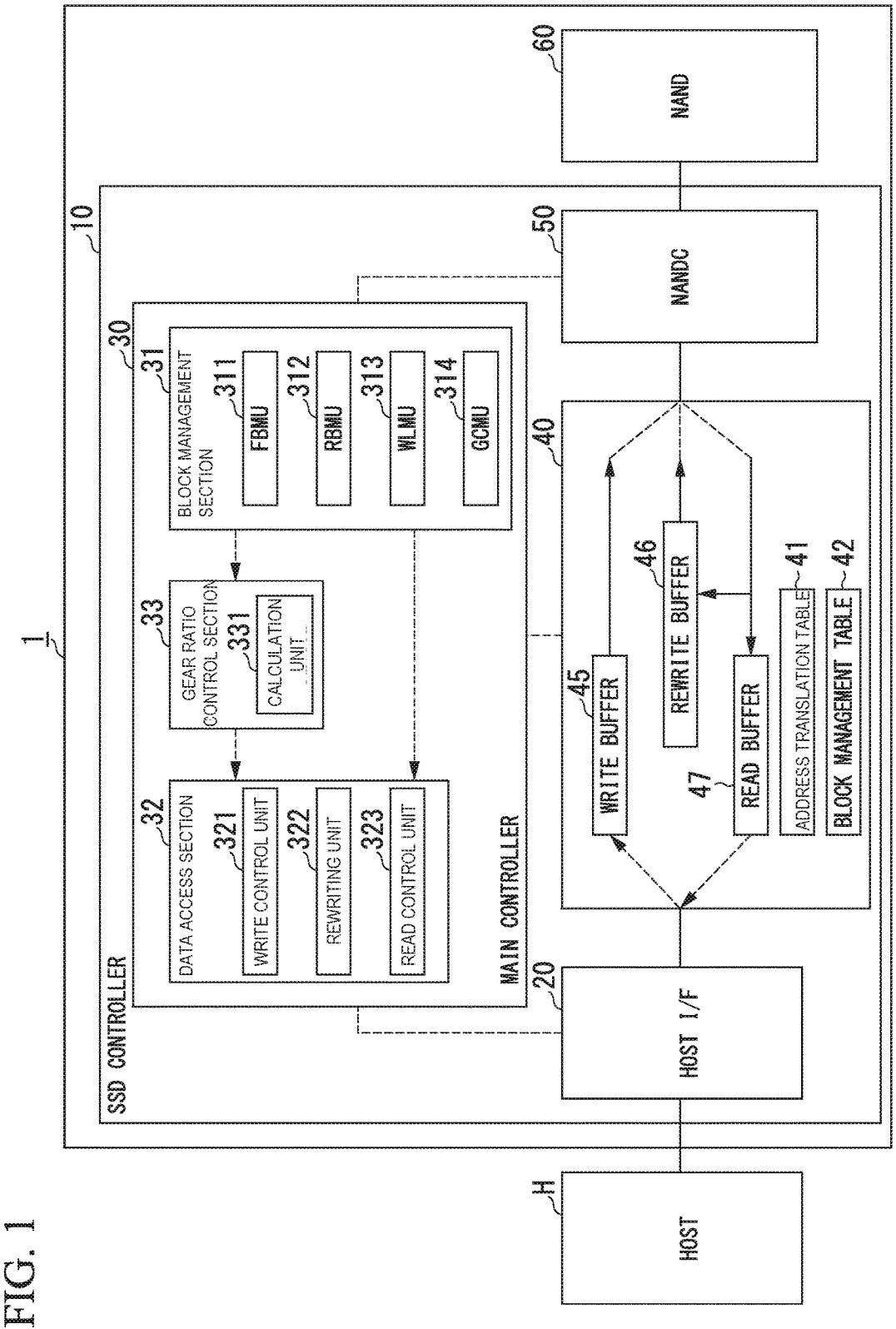
FIG. 1 illustrates an example of a data storage device according to an embodiment.

(First Embodiment)
[Configuration]
FIG. 1 illustrates an example of a data storage device 1. The data storage device 1 is an SSD (solid state drive), for example. The data storage device 1 is connected to a host H via a host interface (below-abbreviated as a host I/F) 20 such as an SATA (serial ATA) interface and an SAS (serial attached SCSI) interface, etc., for example. The host H is a device that carries out information processing, such as a personal computer, a server device, etc., for example. Moreover, the host H may be an image recording device or a different device in which an information processing device is embedded. The image recording device includes a mobile terminal having an imaging device such as a still camera and a video camera, etc., or a desktop video server.

When carrying out data read or data write, the host H adds, to a read request or a write request, an LBA (logical block address), as a logical address, and sends the request via the host interface 20 to the data storage device 1.

The LBA is, for example, a logical address including a serial number starting from zero for each sector (with the size of 512 bytes, for example). In the embodiments, a management unit called as a cluster of which size is greater than the sector size and less than the physical block size is used as a unit for managing data in a data buffer 40 and a NAND 60. While one management unit called as the cluster is used in the present embodiment, a different management unit of which size is greater than the cluster and less than or equal to the block may be used, and thus two management units may be used for data management. In the following embodiments, it is assumed that the cluster size is same as the page size for brevity.

The host H may alternatively use arbitrary key information instead of the above-described LBA. In this case, the data storage device 1 uses an address translation table which indicates correspondence between key information and a physical address instead of an address translation table which indicates correspondence between the LBA and the physical address.

The data storage device 1 includes, for example, an SSD controller (a memory controller) 10 and an NAND flash memory (NAND) 60, which is non-volatile semiconductor memory. The SSD controller 10 includes the host interface (external interface) 20, a main controller (control device) 30, the data buffer 40, and a NAND controller (NANDC) 50, which includes a memory interface. The SSD controller 10 and the NAND 60 may be accommodated in the same housing, or the SSD controller 10 and the NAND 60 may be connected by a cable (directly), or through a network including the cable, a wireless communications network, etc.

The NAND 60 includes a non-volatile semiconductor memory and stores user data designated by the host H. The user data include data generated through processing of the host H, and requested to be stored in the NAND 60 by the host H, or which has already been stored into the NAND 60 by a request of the host H.

Moreover, the NAND 60 may redundantly store management information that is stored in the data buffer 40, for backup. The backup refers to redundantly retaining data in a second storage region which is different from a first storage region to write back data into the first storage region when data stored in the first storage region are lost or corrupted.

The NAND 60 has a memory cell array in which a plurality of memory cells is arranged in a matrix configuration, for example. The matrix refers to a state in which elements thereof are lined up in a first direction and a second direction which intersects the first direction.

The NAND 60 includes a plurality of memory chips. Each of the memory chips includes the memory cell array. The memory cell array includes a plurality of physical blocks. The physical block includes a plurality of physical pages. Writing and reading of data in the NAND 60 are carried out in units of one physical page. Erasure of the data from the NAND 60 is carried out in units of one physical block.

The data buffer 40 is achieved by a semiconductor memory which is accessible at a speed that is higher than the NAND 60 and randomly, for example. The data buffer 40 is, for example, a DRAM (Dynamic Random Access Memory) or an SRAM (Static Random Access Memory). The data buffer 40 includes a write buffer 45 and a rewrite buffer 46 in the storage region.

Write data (user data) transferred from the host H are stored in the write buffer 45, until the write data are written into the NAND 60.

Valid data extracted from a target block of a garbage collection process (below called merely a garbage collection as well) are stored in the rewrite buffer 46 before the valid data are written into a block.

Garbage collection may generally include following steps: selecting at least valid data other than unnecessary data (invalid) stored in one or more first physical blocks or a first storage region; moving the selected valid data into one or more second physical blocks or a second storage region, and releasing the one or more first physical blocks or the first storage region for other data writing. The garbage collection is carried out to reuse a memory region within the one or more first physical blocks or the first storage region, in which the unnecessary data are stored after erasing the data. To reuse the region within the one or more first physical blocks or the first storage region, in which the unnecessary data are stored, valid data in the one or more first physical blocks are moved to the one or more second physical blocks or the second storage region to release the one or more first physical blocks from which the valid data have been moved completely and efficiently provide one or more reusable physical blocks. The unnecessary data refer to data which are not associated with an LBA (logical address). The valid data refer to data associated with the LBA. The rewrite buffer 46 can also be used in a refresh write and a wear leveling.

The data buffer 40 includes a memory region for storing a block management table 42 which is used to manage the state of each block, and an address translation table 41 for translation between a logical address and a physical address, and also includes a read buffer 47. The data buffer 40 may be a single memory device or by a collection of a plurality of memory devices.

The NANDC 50 may include, but is not limited to, a NAND interface circuit (memory interface) configured to perform an interfacing process with the NAND 60, an error correction circuit, and a direct memory access (DMA) controller. The NANDC 50 writes, into the NAND 60, data temporarily stored in the data buffer 40 and reads the data stored in the NAND 60 to transfer to the data buffer 40.

The NANDC 50 carries out error correction on the data to be transferred to the data buffer 40 and reports the main controller 30 of an error occurrence and information which specifies a block that stores the error data.

The main controller 30 may include, but is not limited to, a block management section 31, a data access section 32, and a gear ratio control section 33.

The block management section 31 manages the state of each block in the NAND 60. The block management section 31 may include, but is not limited to, a free block management unit (FBMU) 311, a refresh block management unit (RBMU) 312, a wear leveling management unit (WLMU) 313, and a garbage collection management unit (GCMU) 314.

The free block management unit (FBMU) 311 manages use condition of each block of the NAND 60 based on the block management table 42. The use condition of each block of the NAND 60 includes a first use condition as an active block and a second use condition as a free block. The active block refers to a block in which valid data are stored. The free block refers to a block into which new data can be written. The FBMU 311 refers to the block management table 42 to determine whether the block is the active block or the free block.

FIG. 2 illustrates the block management table 42 which is stored in the data buffer 40. FIG. 2 shows one example of the block management table 42. "Used/unused," which shows whether the corresponding block is an active block or a free block, "error occurrence flag," which shows that an error occurred when data stored in the NAND 60 are read, "the number of rewrite times" of the corresponding block, etc., are registered in the block management table 42 for each block number, which is block identification information. The "used/unused" is written by the data access section 32 in accordance with execution of a write process by the data access section 32. The "error occurrence flag" is changed to an error occurrence state by the RBMU 312, when the RBMU 312 receives a report of the error occurrence from the NANDC 50, and is released from the error occurrence state upon completion of a refresh write process by the data access section 32 (rewriting unit 322). The value of "the number of times of rewrites" of the individual block is rewritten by the data access section 32 (more specifically, the rewriting unit 322).

Returning back to FIG. 1, the refresh block management unit (RBMU) 312 will be described. Based on the block management table 42, the RBMU 312 manages a block that needs a refresh write process. The refresh write process is a process during which, based on a factor different from the storage density of valid data in a target block, data stored in the target block are rewritten into a different block. The factor different from the storage density of the valid data stored in the target block includes occurrence of errors in the course of data read processes. The RBMU 312 carries out rewriting of the data, including at least all valid data stored in the target block during the refresh write process. Moreover, the RBMU 312 may carry out the rewriting of the data, including a part of data other than the valid data in the target block during the refresh write process. For example, the RBMU 312 may carry out rewriting of only valid data, or all data, including all valid data and all invalid data in the target block.

The RBMU 312 receives the report of the error occurrence from the NANDC 50 and detects that an error occurred in the course of reading data from the NAND 60. The RBMU 312 specifies a block in which the error occurred based on information on the error-occurred position of the block from the NANDC 50. The RBMU 312 puts an "error occurrence flag" in the block management table 42 for the specified block. The RBMU 312 refers to the block management table 42 to detect the error occurrence state.

Then, based on the error occurrence state, the RBMU 312 issues instructions on the refresh write process to the data access section 32. Moreover, the RBMU 312 makes a report, to the gear ratio control section 33, that the instructions on the refresh write process have been issued. The rewriting unit 322 of the data access section 32 executes the process in accordance with the instructions.

The RBMU 312 may detect the error occurrence state for each preset period. For example, the RBMU 312 specifies a block in which an error newly occurred in accordance with differential information on the error occurrence state for each preset period.

Moreover, the RBMU 312 may use a counter (not shown) to count the number of blocks in which the error newly occurred in the preset period. The RBMU 312 may set the number of blocks in which the error occurred in the period as frequency of requests for the refresh write process due to the error.

The wear leveling management unit (WLMU) 313 manages the number of rewrite times for each block of the NAND 60 based on the block management table 42. Wear leveling is a process to make the number of rewrite times uniform among the blocks of the NAND 60. The number of rewrite times is counted by counting the number of times the corresponding block was set as a free block through the refresh write process, or the number of erase times of the block. In other words, the WLMU 313 operates such that the number of rewrite times of each block of the NAND 60 to become uniform.

The WLMU 313 designates, to the data access section 32, a block with less number of rewrite times as a data-write-destination block based on the number of rewrite times of each block in the block management table 42 (First WL instructions). In response thereto, the write control unit 321 of the data access section 32 performs writing data into the data-write-destination block during a writing operation requested by the host H.

Moreover, the WLMU 313 issues, to the data access section 32, an instruction to designate an active block with less number of rewrite times as a movement-source active block, move data in the designated active block, and change the active block to a free block (Second WL instruction). Moreover, the WLMU 313 transmits, to the gear ratio control section 33, a report that the second WL instruction has been issued. The rewriting unit 322 of the data access section 32 executes the process in accordance with the above-described first and second WL instructions. The process according to the second WL instruction is a type of refresh write, so that this process is handled as a refresh write process by the gear ratio control section 33.

The garbage collection management unit (GCMU) 314 causes garbage collection to be performed, in which, for example, an active block with less valid data ratio is selected as a target block, and the target block is released as a free block after valid data therein are moved. The GCMU 314 issues an instruction to carry out the garbage collection to the data access section 32. The rewriting unit 322 of the data access section 32 executes the garbage collection in accordance with the instruction.

The number of rewrite times of each block in the block management table 42 is incremented by one, each time the process of writing from the host H, the refresh write process, and the garbage collection process is carried out.

The gear ratio control section 33 includes a calculation device 331. The gear ratio control section 33 adjusts gear ratios. The gear ratios according to the present embodiment includes a first gear ratio GR1 (first target value) and a second gear ratio GR2 (second target value). The gear ratio control section 33 adjusts the second gear ratio GR2 such that the frequency of the host write process at the second gear ratio GR2 is lower than the frequency of the host write process at the first gear ratio GR1.

The first gear ratio GR1 is a target value used when a refresh write process (first process) is not carried out. The first gear ratio GR1 is a ratio of a second process with respect to a third process. The second process may be a write process of writing data from the host H into the NAND 60. The third process may be a garbage collection process to move valid data within a first block of the NAND 60 to a second block different from the first block in the NAND 60 and release the first block as a free block. The first gear ratio GR1 is calculated based on the ratio of the number of execution times or frequency of the write process of writing data from the host H with respect to the total of the number of execution times or frequency of the process of writing data from the host H and the number of execution times or frequency of the garbage collection process.

The second gear ratio GR2 is a target value used when a refresh write process (first process) is carried out. The second gear ratio GR2 is a ratio of the number of execution times or the frequency of the process of writing data from the host H with respect to the total of the number of execution times or the frequency of the process of writing data from the host H, the garbage collection process, and the refresh writes. As a result, the second gear ratio GR2 becomes lower than the first gear ratio GR1 when the refresh write process is carried out.

FIG. 3 illustrates an example of a flowchart of a process executed by the gear ratio control section 33. The gear ratio control section 33 determines whether there is any refresh write request based on the report from the block management section 31 (S100). Here, the gear ratio control section 33 determines that there is a refresh write request when the RBMU 312 informs that an instruction to perform the refresh write process was issued and when the WLMU 313 informs that the second WL instruction was issued.

When it is determined that there is no refresh write request (No in S100), the gear ratio control section 33 controls the data access section 32 at the first gear ratio GR1 (S102). On the other hand, when it is determined that there is a refresh write request (Yes in S100), the calculation device 331 calculates the second gear ratio GR2 (S104) and the gear ratio control section 33 controls the data access section 32 at the second gear ratio GR2 (S106).

Referring back to FIG. 1, the gear ratio control section 33 generates a processing schedule such that read-write control, garbage collection, refresh write, wear leveling, etc., are performed in accordance with the first gear ratio GR1 or the second gear ratio GR2, and controls the data access section 32 to perform various processes in accordance with the processing schedule. The process which generates the processing schedule may be performed by the data access section 32.

The data access section 32 carries out processes such as the read-write control of data designated by the host H, the garbage collection, the refresh write, and the wear labeling, etc. The data access section 32 instructs the NANDC 50 to execute these processes.

The data access section 32 includes a read control unit 323, a write control unit 321, and the rewriting unit 322.

The read control unit 323 carries out a control of reading data designated by the host H. For example, in the control of reading the data designated by the host H, when the host H gives inputs of a read command and an LBA as a read address, the read control unit 323 refers to a forward-lookup address translation table 41 to read data corresponding to the LBA from the NAND 60 and transmits the read data via the read buffer 47 to the host H.

FIG. 4 illustrates the address translation table 41 managed by the data buffer 40. An LBA cluster address, the storage position (a physical address: a block number+the storage position within a block, for example) of the cluster data, and a data presence/absence flag which indicates whether data are present in the cluster, are registered in each row of the address translation table 41. The cluster address is obtained by dividing the LBA by the cluster size. The address translation table 41 may be used to search, from a logical address, a physical address of a storage device that stores corresponding data, and thus serves as a forward-lookup table. This forward-lookup address translation table 41 is used in the read process, the garbage collection process, the refresh write process, etc. Moreover, if the relationship between the cluster address and the storage position of the NAND 60 is changed because of the writing of data into the NAND 60, the address translation table 41 is updated.

Returning to FIG. 1, to carry out garbage collection on a target block designated by the block management section 31, the read control unit 323 reads data stored in the target block of the NAND 60 and writes the read data into the rewrite buffer 46.

The write control unit 321 carries out write control of the data received from the host H. The write control unit 321 writes the data received from the host H to a free block designated by the block management section 31.

Upon input of write data and a write command including the LBA as the write address, the write control unit 321 writes the write data into the write buffer 45. Upon performing the write process, the write control unit 321 updates the address translation table 41 and the block management table 42.

As described above, the rewriting unit 322 carries out a process of rewriting the data read from the NAND 60. The data to be written by the rewriting process includes data to be subject to processes such as the garbage collection process, the refresh write process, wear leveling, etc.

If the garbage collection process, the refresh write process, or the wear leveling process is carried out, the rewriting unit 322 releases the movement-source block (target block) as a free block and updates the block management table 42. The rewriting unit 322 sets the "used/unused" of the movement-source block in the block management table 42 to "unused" and changes the "error occurrence flag" to no error occurrence.

[Gear Ratio Control]

The first gear ratio GR1, which is calculated by the calculation unit 331, may be expressed as M/(M+N), for example. M is the frequency or the number of execution times (below-recited as merely the frequency) of a host write. N shows the frequency or the number execution times of garbage collection. The first gear ratio GR1 may be, for example, a value designated by the host H, etc., or a fixed predetermined value.

On the other hand, the second gear ratio GR2, which is calculated by the calculation unit 331, is expressed as M/(M+N+R), for example. R is the frequency or the number of execution times of the refresh write process.

Values of M, N, and R is equal to or greater than zero. Specifically, when the frequency or the number of execution times is expressed as a scaled value, the values of M, N, and R are respectively set to an integer of zero or more.

The calculation unit 331, for example, sets M, N, and R such that the first gear ratio GR1 multiplied by (1−α) is equal to the second gear ratio GR2. α corresponds to an acceptable decrease level of the host write performance, where 0≤α≤1. Moreover, a may be designated by the host H or a fixed predetermined value.

The calculation unit 331, for example, determines M, N, and R such that they meet GR1×(1−α)=GR2 under a condition that the value N is fixed and the value M is decreased in accordance with increase of the value R upon performing the refresh write process. For example, the above-recited equation may be approximated to calculate M, N, and R as an integer of zero or more. As a result, to the extent that the value M is reduced, the second gear ratio GR2 is smaller than the first gear ratio GR1.

Figure 5:
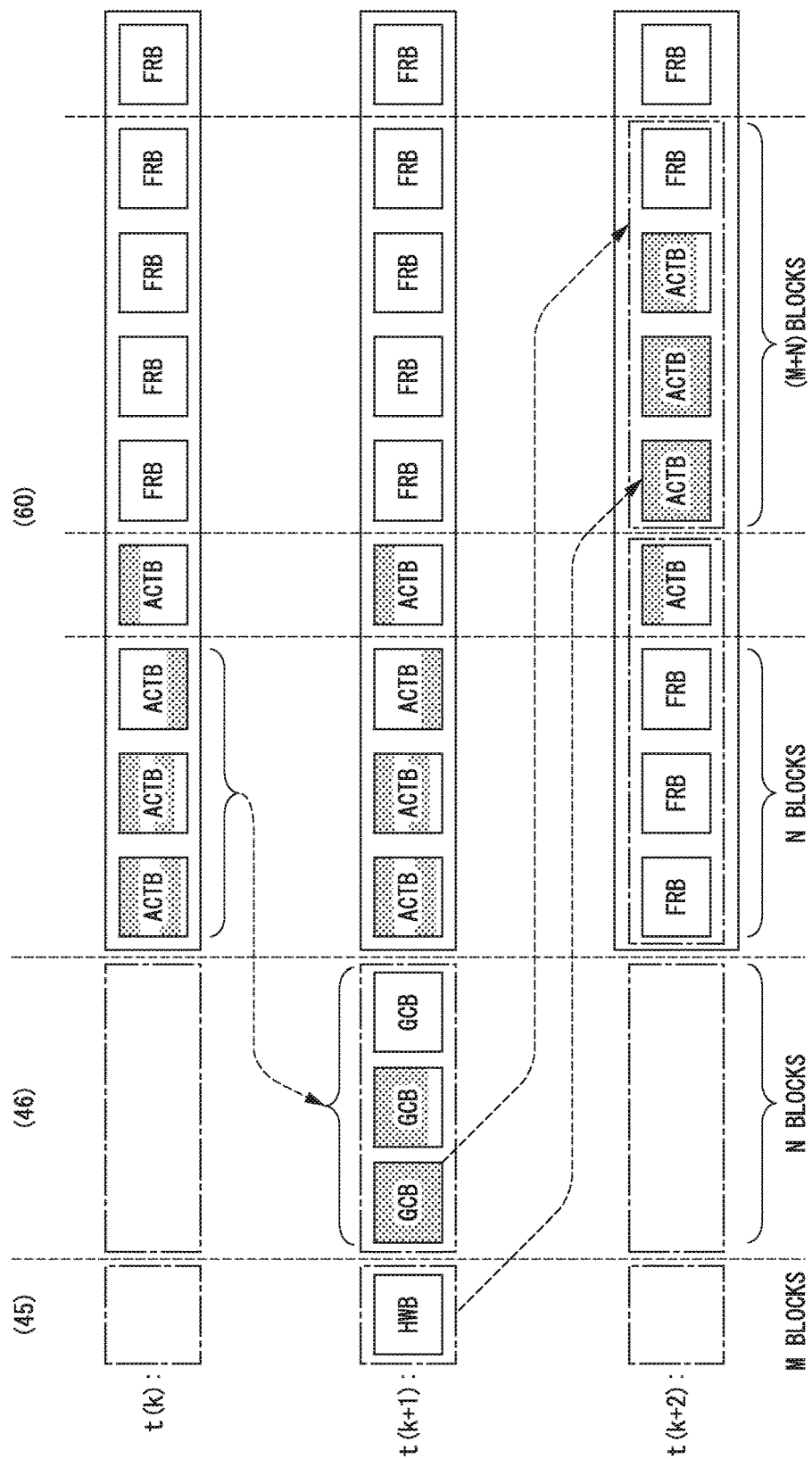
FIG. 5 illustrates block states when data writing is carried out at a "gear ratio" set for when a refresh write process is not carried out.
Figure 6:
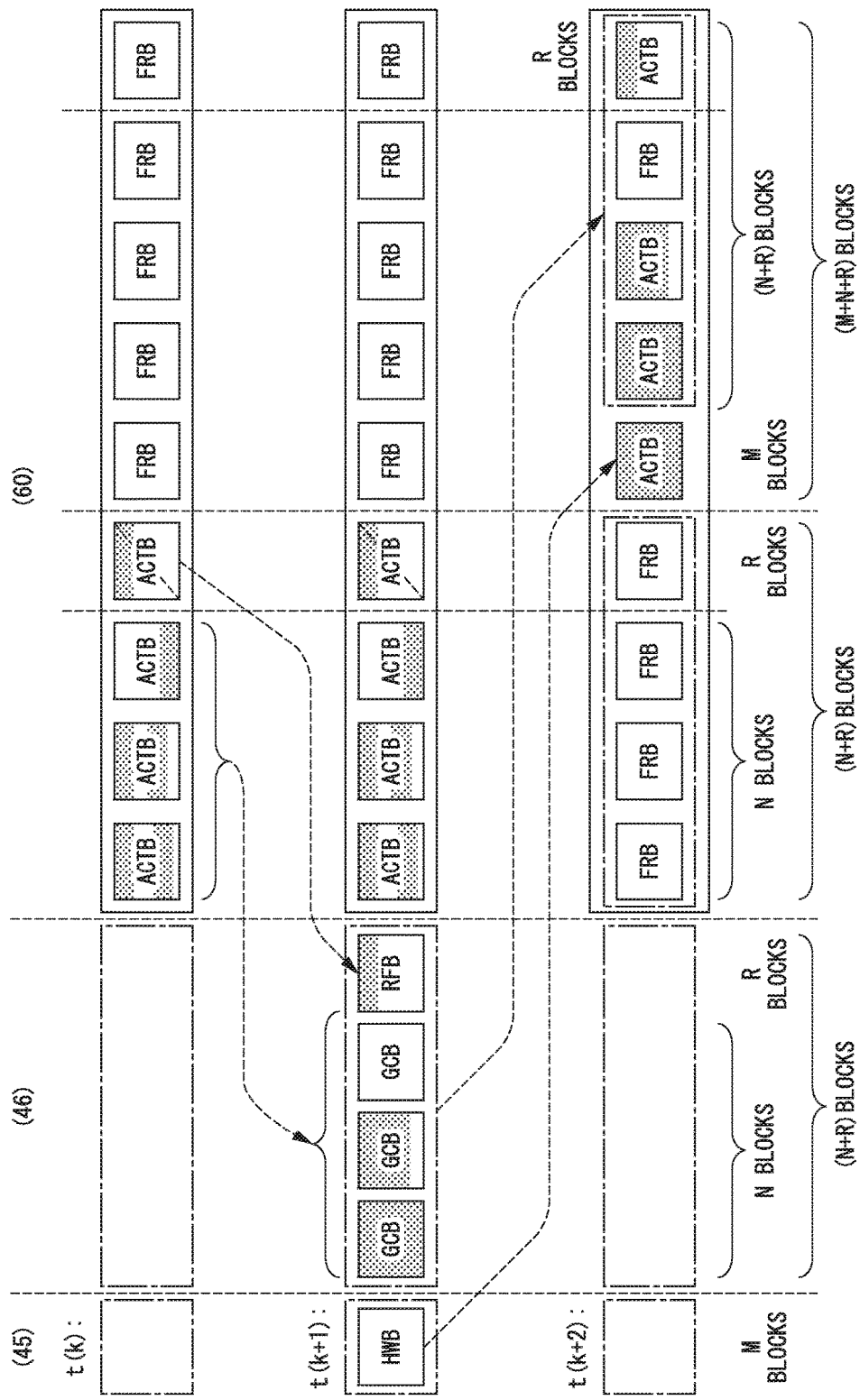
FIG. 6 illustrates block states when data writing is carried out at the "gear ratio" set for when the refresh write process is carried out.

With reference to FIGS. 5 and 6, an overview description on the gear ratio control is provided. FIG. 5 illustrates how the gear ratio control is executed when the refresh write process is not carried out. The upper, middle, and lower rows shown in FIG. 5 indicate changes in the state of the write buffer 45, the rewrite buffer 46, and the NAND 60 in accordance with elapse of time. Boxes "ACTB", "FRB", "HWB", and "GCB" in FIG. 5 respectively indicate "an active block (ACTB)", "a free block (FRB)", "a block (HWB) written into the write buffer 45", and "a block (GCB) written into the rewrite buffer 46". One box corresponds to one block.

At time t (k) shown in the upper row, four active blocks (ACTB) and five free blocks (FRB) are present as blocks of the NAND 60. Hatching within the active block (ACTB) shows valid data. In the free block (FRB), no valid data stored. At time t(k), no block for the host write process and no block for the garbage collection is present, so that the write buffer 45 and the rewrite buffer 46 are in a free state.

At time t (k+1) shown in the middle row, the block for the host write process (HWB) and the block for the garbage collection (GCB) are respectively written into the write buffer 45 and the rewrite buffer 46. The block (HWB) is a block into which data received from the host H are written. The block (GCB) is a block into which data read from the NAND 60 and received from the NANDC 50 are written. Data of the block (HWB), which are written into the write buffer 45, and data of the block (GCB), which are written into the rewrite buffer 46, are to be written into the NAND 60. At time t(k+1), the state of the NAND 60 does not change from time t(k).

At time t (k+2) shown in the lower row, a process of writing into the NAND 60 the data in the write buffer 45 and the rewrite buffer 46 is performed. Data of the block (HWB) for the host write process and data of the block (GCB) for the garbage collection that were written into the write buffer 45 and the rewrite buffer 46, respectively, are written into the free block (FRB) of the NAND 60. This writing process causes data stored in the blocks to be subjected to the garbage collection of the NAND 60 to be unnecessary data. For that reason, these blocks are released as free blocks (FRB).

As shown in FIG. 5, since the processing between time t(k) to time t(k+2) is carried out at the first gear ration GR1, the ratio of the number of blocks for which the host write was performed with respect to the number of blocks for which the garbage collection was performed is M:N. In FIG. 5, M=1 and N=3.

FIG. 6 illustrates how the gear ratio control is executed when the refresh write process is carried out. The definition of rows in FIG. 6 is the same as FIG. 5. The "RFB" in the middle row shows a block of which data are copied to the rewrite buffer 46 from the block to be subjected to the refresh write process. Moreover, slanted lines are shown in active blocks (ACTB) which need the refresh write process.

In this case, the processes are carried out at the second gear ratio GR2. Thus, the ratio among the number of blocks for which the host write was performed, the number of blocks for which the garbage collection was performed, and the number of blocks for which the refresh was performed is M:N:R. In FIG. 6, M=1, N=3, and R=1.

Figure 7:
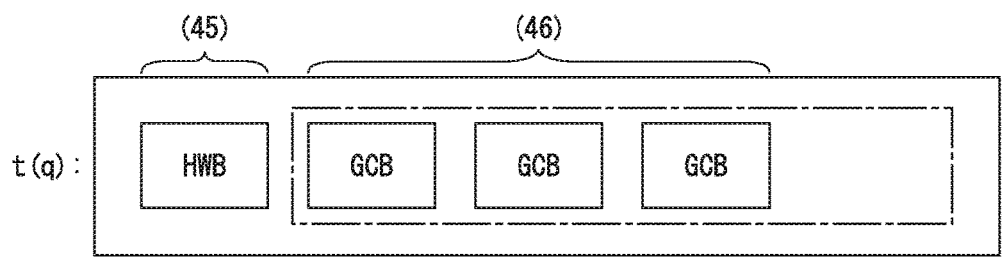
FIG. 7 illustrates the state of a write buffer and a rewrite buffer when the refresh write process is not carried out.

FIG. 7 illustrates the state of the write buffer 45 and the rewrite buffer 46 when the refresh write process is not carried out. As shown, when the refresh write process is not performed, for example, in the write buffer 45 and the rewrite buffer 46, data are regularly stored at the ratio of M:N (M=1 and N=3 shown).

Figure 8:
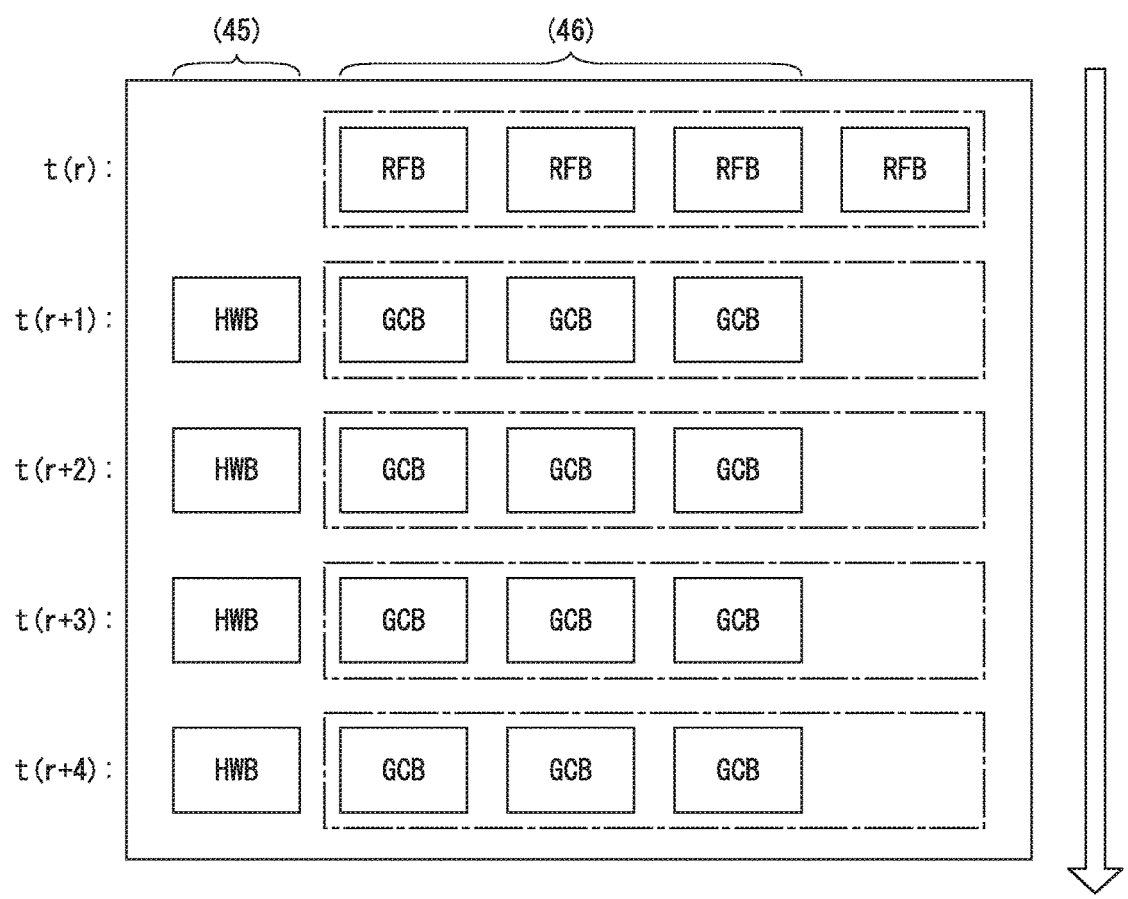
FIG. 8 illustrates the state of the write buffer and the rewrite buffer when the refresh write process is carried out.

FIG. 8 illustrates the state of the write buffer 45 and the rewrite buffer 46 when the refresh write process is carried out. As shown, when the refresh write process is performed, at time t(r), four blocks of data for the refresh write are stored in the rewrite buffer 46, and, at time t(r+1), time t(r+2), time t(r+3), and time t(r+4), one block of data corresponding to the host write is stored in the write buffer 45 and three blocks of data for the garbage collection are stored in the rewrite buffer 46.

As a result, from time t(r) to time t(r+4), four blocks of the host write, 12 blocks of the garbage collection, and four blocks of the refresh write are performed, which means that the proportion of the host write is 4/(4+12+4)=20%. This shows a 5% reduction in the performance when compared with 25% (1/(1+3)), which is the proportion of the host write when the refresh write process is not performed.

While the data storage device 1 successively writes a plurality of blocks into the NAND 60 in the above example, the data storage device 1 may perform process other than the write processes such as the host write, garbage collection, and the refresh write process as long as the write processes are carried out sequentially. For example, the process other than the write process includes a process of reading from the NAND 60, etc. In such a case, a period for carrying out a process other than the write process may be excluded from the period subject to the calculation of the gear ratios G1 and G2.

Figure 9:
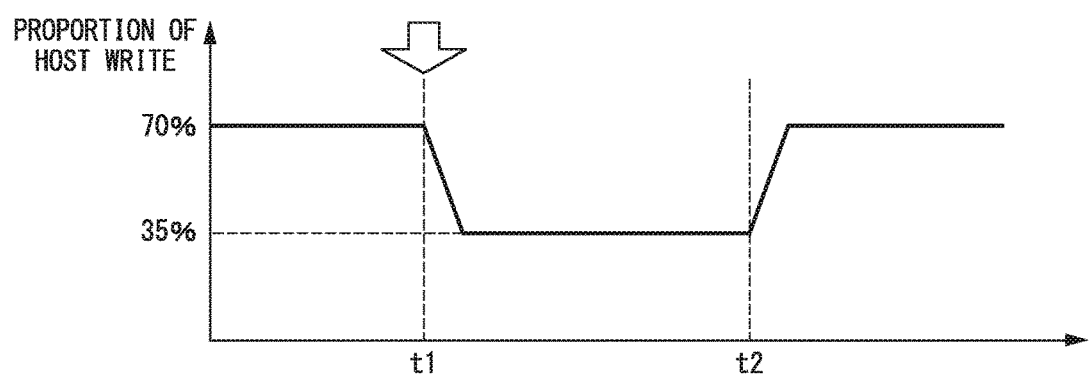
FIG. 9 illustrates changes in the proportion of a host write depending on frequency of the refresh write process in an SSD according to a comparative example.

Here, a comparative example is discussed. FIG. 9 illustrates decrease of the proportion of the host write due to the refresh write process carried out in the SSD according to the comparative example. As shown, the horizontal axis represents time, while the vertical axis represents the proportion of the host write with respect to all write processes, including the rewrite in the SSD. Since the refresh write process is an important process in maintaining reliability of the SSD, it is usually performed preferentially. Therefore, if refresh write process requests are made in high frequency at time t1, the proportion of the host write may decrease rapidly. In FIG. 9, control at the first gear ratio GR1 is performed up to time t1, so that the ratio of the number of blocks for which the host write was performed with respect to the number of blocks for which the garbage collection was performed is M:N. For example, the proportion of the host write is 70% when M=7 and N=3.

Past time t1, control at the second gear ratio GR2 is performed. Thus, the ratio among the number of blocks for which the host write was performed, the number of blocks for which the garbage collection was performed, and the number of blocks for which the refresh was performed is M:N:R, wherein M, N, and R are respectively set to M=7, N=3, and R=10. The proportion of the host write in this case is 35% (7/(7+3+10)).

In this way, when the refresh write process request occurs at high frequency, the proportion of the host write rapidly decreases from 70% to 35%. When time t2 is past, the control is brought back to the control at the first gear ratio GR1, so that the proportion of the host write is brought back to the previous value, while the responsiveness of the host write decreases in the period between time t1 and time t2. In the case of the above, there is no restrictions on the number of blocks for which the refresh write process is performed, so that, when the number of blocks for which refresh write processes is performed increases, the proportion of the host write further decreases.

Figure 10:
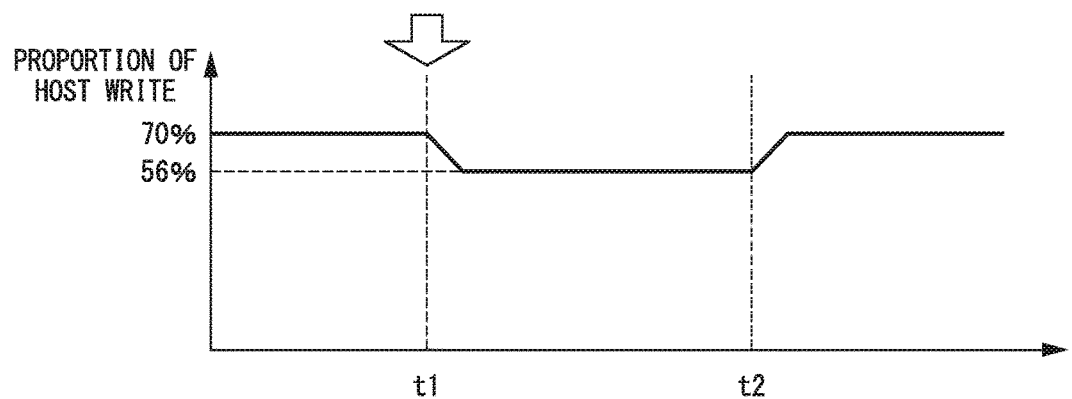
FIG. 10 illustrates changes in the proportion of the host write in the data storage device according to a first embodiment.

FIG. 10 illustrates the proportion of the host write in the data storage device 1 as time passes according to the present embodiment. As described above, the data storage device 1 according to the present embodiment controls the proportion of the host write such that the proportion when the refresh write process is carried out does not become lower than the proportion when no refresh write process is carried out to the extent that the host write performance of the data storage device 1 decreases excessively. In FIG. 10, the value alpha ($\alpha$) indicating the performance reduction rate of the host write process is set to 0.2. When the proportion of the host write up to time t1 is 70% in the same manner as in FIG. 9, the gear ratio control section 33 calculates the proportion of the host write which is set as a target value at time t1. In the above case, the calculated target value is 56% (=GR1 ×(1-$\alpha$)). Target value management may be carried out based on the calculated target value to keep the decrease of the proportion of the host write up to 56% from 70%. When there are certain number of blocks for which the refresh write process is performed in the control state of M=7 and N=3, the gear ratio control section 33 calculates the number of blocks for which the refresh write processes can be performed on condition that the proportion does not become below 56%. In the above-described case, R=2. As a result, the proportion of the host write decreases up to 58% (=7/(7+3+2)) from 70%. As a result, the number of blocks for which the refresh write processes are carried out may be obtained while suppressing a decrease in the responsiveness to host write requests.

The above-described block management section 31 of the SSD controller (memory controller) 10, or the data storage device 1 according to the first embodiment manages a request for carrying out a refresh write process. The calculation unit 331 calculates the gear ratio GR2 based on the gear ratio GR1. The gear ratio control section 33 adjusts the frequency of the garbage collection and the host write process so as to correspond to the gear ratio GR1 when the refresh write process is not carried out, and adjusts at least the frequency of the refresh write process so as to conform to the calculated gear ratio GR2 when the refresh write process is carried out. The data access section 32 operates to carry out the various write processes in accordance with the adjusted frequencies.

The data storage device 1 or the SSD controller 10 according to the first embodiment described above includes the block management section 31, the calculation unit 331, the gear ratio control section 33, and the data access section 32, and restricts continuous refresh write processes when the data storage device 1 receives a data write request from the host H. In this way, the data storage device 1 may rapidly respond to the data write request from the host H.

Moreover, according to the data storage device 1 or the SSD controller (memory controller) 10 according to the present embodiment, the host I/F 20 is connected to the host H, and the NANDC 50 is connected to the NAND 60. The main controller 30 controls data writing to the NAND 60 via the NANDC 50. The main controller 30 executes a refresh write process of writing data stored in a block, which is a unit of rewriting data, into a different block; a host write process of writing, into the NAND 60, data received from the host H via the host I/F 20; and a garbage collection process of moving at least valid data within a first block of the NAND 60 to a second block and releasing the first block as a free block. The main controller 30 calculates the first gear ratio GR1 which corresponds to an execution ratio of the host write process with respect to the garbage collection process when the refresh write process is not carried out and the second gear ratio GR2 which corresponds to an execution ratio among the refresh write process, the host write process, and the garbage collection process when the refresh write process is carried out. When the refresh write process is not carried out, the main controller 30 adjusts the execution frequency of the host write process with respect to the garbage collection process so as to correspond to the first gear ratio GR1. When the refresh write process is carried out, the main controller 30 adjusts the execution frequency of the refresh write process with respect to the other write processes so as to correspond to the second gear ratio GR2.

The above-described data storage device 1 or the SSD controller 10 (memory controller) according to the first embodiment includes the host I/F 20, the NANDC 50, and the main controller 30 and restricts continuous refresh write processes when a data write request from the host H is received by the data storage device 1. As a result, the data storage device 1 can rapidly respond to a data write request from the host H.

Moreover, according to the data storage device 1 of the present embodiment, the main controller 30 sets the second gear ratio GR2 such that the frequency of the host write process at the second gear ratio GR2 is brought to be lower than the frequency of the host write process at the first gear ratio GR1. As a result, the data storage device 1 can set the frequency of the host write process at the second gear ratio GR2 to a value lower than the frequency of the host write process at the first gear ratio GR1 and can respond rapidly to a data write request of the host H.

Moreover, according to the data storage device 1 of the present embodiment, the main controller 30 calculates the second gear ratio GR2 based on the first gear ratio GR1 and a value indicating an acceptable performance reduction of the host write process. As a result, the data storage device 1 can manage the frequency of the process of writing into the NANDC 60 based on the second gear ratio GR 2 and can rapidly response to the data write request from the host H when the refresh write process is carried out.

Moreover, the data storage device 1 according to the present embodiment receive a value to calculate the second gear ratio GR2 from the host H via the host I/F 20 and calculate the second gear ratio GR2 based on the received value and the first gear ratio GR1.

(Second Embodiment)

In a second embodiment, the gear ratio control section 33 adjusts the frequency of the refresh write process based on a reason that the refresh write process request was issued. Below, description will be made mainly on this point.

The reason of carrying out the refresh write process includes: (1) an error was detected as a result of carrying out a process of reading from the NAND 60; and (2) the need for making the number of rewrite times uniform among the blocks of the NAND 60.

Of these, the refresh write process should be carried out more urgently for the reason (1) than the reason (2), because data may be lost when an error is detected. In contrast, simply making the rewrite times uniform may be in less urgent when no error is detected.

(A) The gear ratio control section 33 may decrease the frequency of performing the refresh write process when the importance of performing the refresh write process rather than the other write processes is low, for example. As described below, when parameters defining the second gear ratio GR2 are M, N, R, the gear ratio control section 33 sets R such that the frequency is decreased by $\Delta R$, and the frequency corresponding to the decreased amount $\Delta R$ is allocated to N and M, where $0 \leq \beta \leq 1$.

$$N \rightarrow N + \beta \times \Delta R$$

$$M \rightarrow M + (1-\beta) \times \Delta R$$

$$R \rightarrow R - \Delta R$$

(B) Moreover, when the importance of performing the refresh write process is higher than that of performing the other write processes, the gear ratio control section 33 increases the frequency of performing the refresh write process. As described below, when parameters defining the second gear ratio GR2 are M, N, R, the gear ratio control section 33 sets R such that the frequency is increased by $\Delta R$, and the frequency corresponding to the increased amount $\Delta R$ is subtracted from N and M, where $0 \leq \beta 1$.

$$N \rightarrow N - \beta \times \Delta R$$

$$M \rightarrow M - (1 \rightarrow \beta) \times \Delta R$$

$$R \rightarrow R + \Delta R$$

Figure 11:
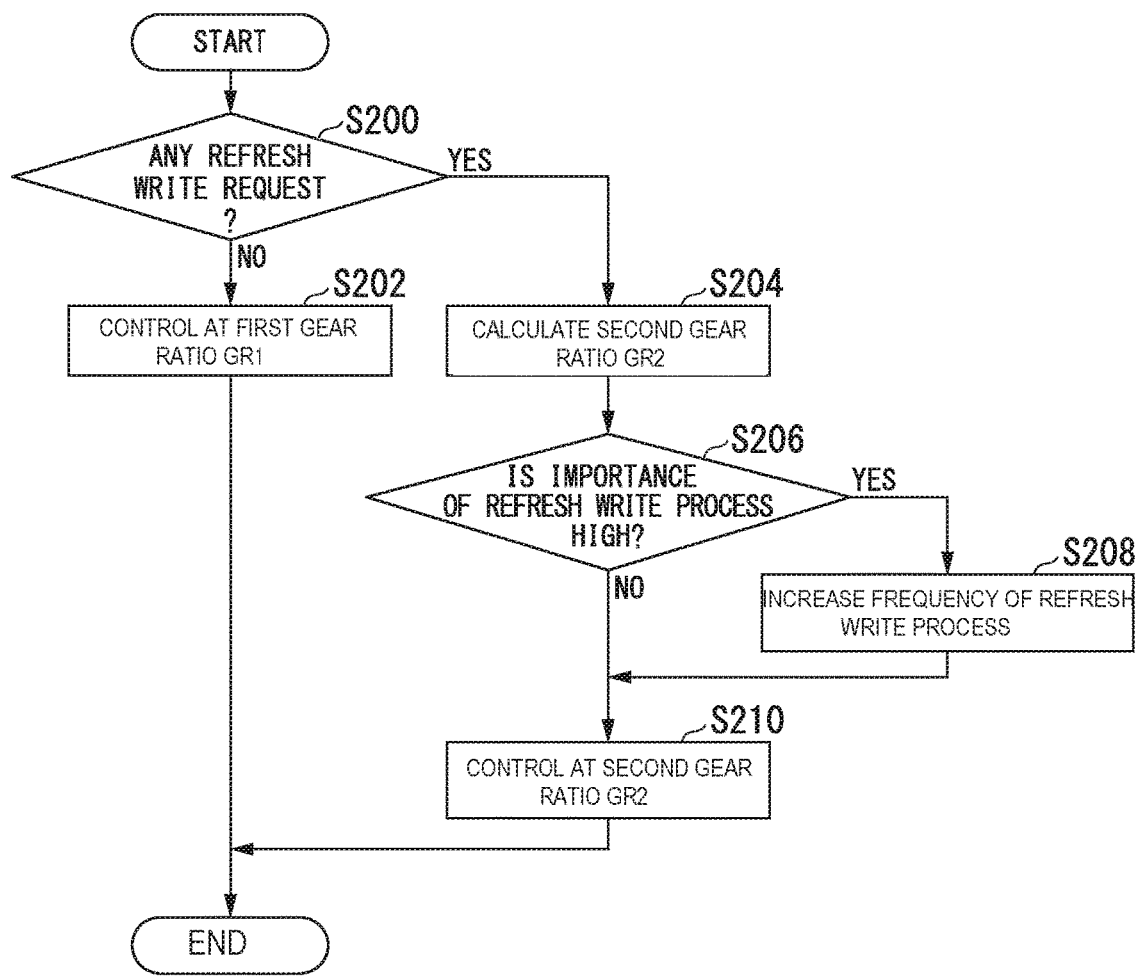
FIG. 11 illustrates a flowchart of a process executed in a control device according to a second embodiment.

FIG. 11 illustrates an example of a flowchart of a process executed by the gear ratio control section 33 according to the second embodiment. The process shown in FIG. 11 indicates a flowchart of the process for the case (B) described above.

First, the gear ratio control section 33 determines whether there is any refresh write request based on a report from the block management section 31 (S200). When it is determined that there is no refresh write request (No in S200), the gear ratio control section 33 controls the data access section 32 at the first gear ratio GR1 (S202).

On the other hand, when it is determined that there is a refresh write request (Yes in S200), the calculation unit 331 calculates the second gear ratio GR2 (S204). Then, the gear ratio control section 33 determines whether the importance of performing the refresh write process is high (S206). When the importance of performing the refresh write process is determined to be high (Yes in S206), the gear ratio control section 33 increases the frequency of the refresh write process (S208). Then, the gear ratio control section 33 controls the data access section 32 at the second gear ratio GR2 (S210) to complete the process of FIG. 11. On the other hand, when the importance of the refresh write process is determined to be not high (No in S206), the gear ratio control section 33 carries out S210 without carrying out S208.

The data storage device 1 according to the second embodiment can flexibly adjust the frequency of the refresh write process based on the reason that triggers the refresh write process. As a result, the data storage device 1 according to the second embodiment can reliably maintain written data while quickly writing data.

(Third Embodiment)

In a third embodiment, the gear ratio control section 33 adjusts the frequency of the refresh write process based on remaining work load of the refresh write process. More specifically, in the third embodiment, the gear ratio control section 33 adjusts the number of blocks of the refresh write process which is carried out within a garbage collection term in accordance with the number of blocks for which the refresh write process are to be performed. Instead, the gear ratio control section 33 may adjust the number of blocks of the refresh write process which is carried out within the garbage collection term based on the number of requests for the refresh write process. The garbage collection term is a period of time based on which the gear ratio is calculated. The garbage collection term may be the period corresponding to one garbage collection process, or may refer to the period corresponding to a plurality of garbage collection processes. Below, description will be made mainly on this point.

Figure 12:
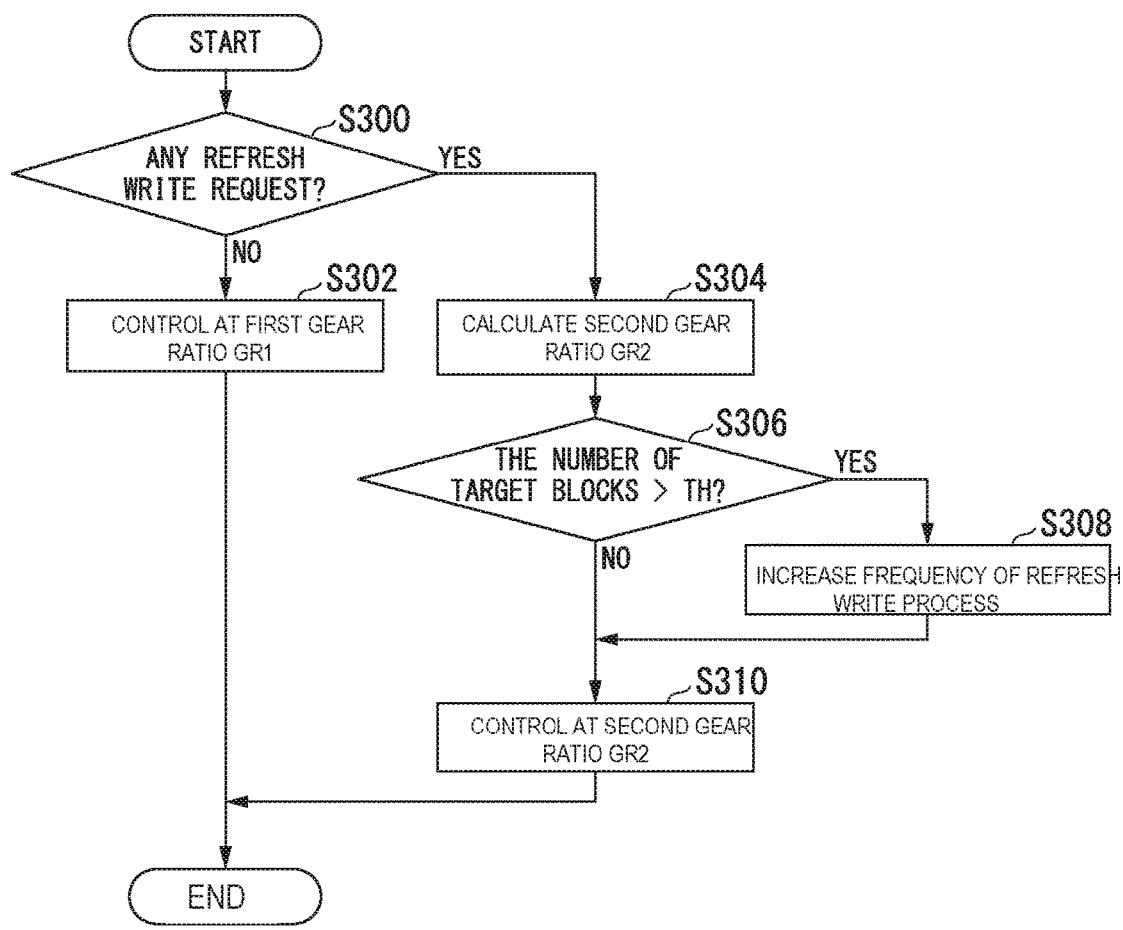
FIG. 12 illustrates a flowchart of a process executed by a control device according to a third embodiment.

FIG. 12 illustrates a flowchart of a process executed by the gear ratio control section 33 according to the third embodiment.

First, the gear ratio control section 33 determines whether there is any refresh write request based on a report from the block management section 31 (S300). When it is determined that there is no refresh write request (No in S300), the gear ratio control section 33 controls the data access section 32 at the first gear ratio GR1 (S302).

On the other hand, when it is determined that there is a refresh write request (Yes in S300), the calculation unit 331 calculates the second gear ratio GR2 (S304). Then, the gear ratio control section 33 determines whether the number of blocks to be subjected to the refresh write process is greater than a threshold Th (S306). When it is determined that the number of blocks to be subjected to the refresh write process is greater than the threshold Th (Yes in S306), the gear ratio control section 33 increases the frequency of the refresh write process (S308). The process of increasing the frequency of the refresh write process may be the same as that in the second embodiment. Then, the gear ratio control section 33 controls the data access section 32 at the second gear ratio GR2 (S310) to complete the process. On the other hand, when it is determined that he number of blocks to be subjected to the refresh write process is not greater than the threshold Th (No in S306), the gear ratio control section 33 carries out S310 without carrying out S308.

In other words, when there is a large number of non-executed refresh write processes, the frequency of the host write temporarily to the extent that causes the performance reduction rate to decrease more than the acceptable limit. However, the above-described control of the present embodiment enables the refresh write process to be completed in the meantime and the data storage device 1 to be rapidly brought back to a preferable state.

The data storage device 1 according to the third embodiment can not only achieve the same advantage as the first embodiment, but also avoid the situation that excessive amount of the refresh write process remains unfinished due to performing of the host write. As a result, the data storage device 1 according to the third embodiment can maintain the balance of the host write process and the refresh write process at a preferable level and perform more flexible write processing.

In the present embodiment, the gear ratio control section 33 adjusts the frequency of the refresh write process based on the number of requests for the refresh write process or the number of blocks to be subjected to the refresh write process. Alternatively, a different functional device may perform such an operation.

(Fourth Embodiment)

In a fourth embodiment, the gear ratio control section 33 adjusts the frequency of the refresh write process based on a comparison of the frequency and the required time of the refresh write process. More specifically, in the fourth embodiment, the gear ratio control section 33 compares the required time (e.g., average required time) of one refresh write process and the period (e.g., average period) of the refresh write processes. The period of the refresh write processes varies with the frequency thereof. When the period is less than the required time multiplied by the particular number, the gear ratio control section 33 adjusts the number of blocks of the refresh write process which is carried out within the garbage collection term in accordance with the number of subject blocks.

Figure 13:
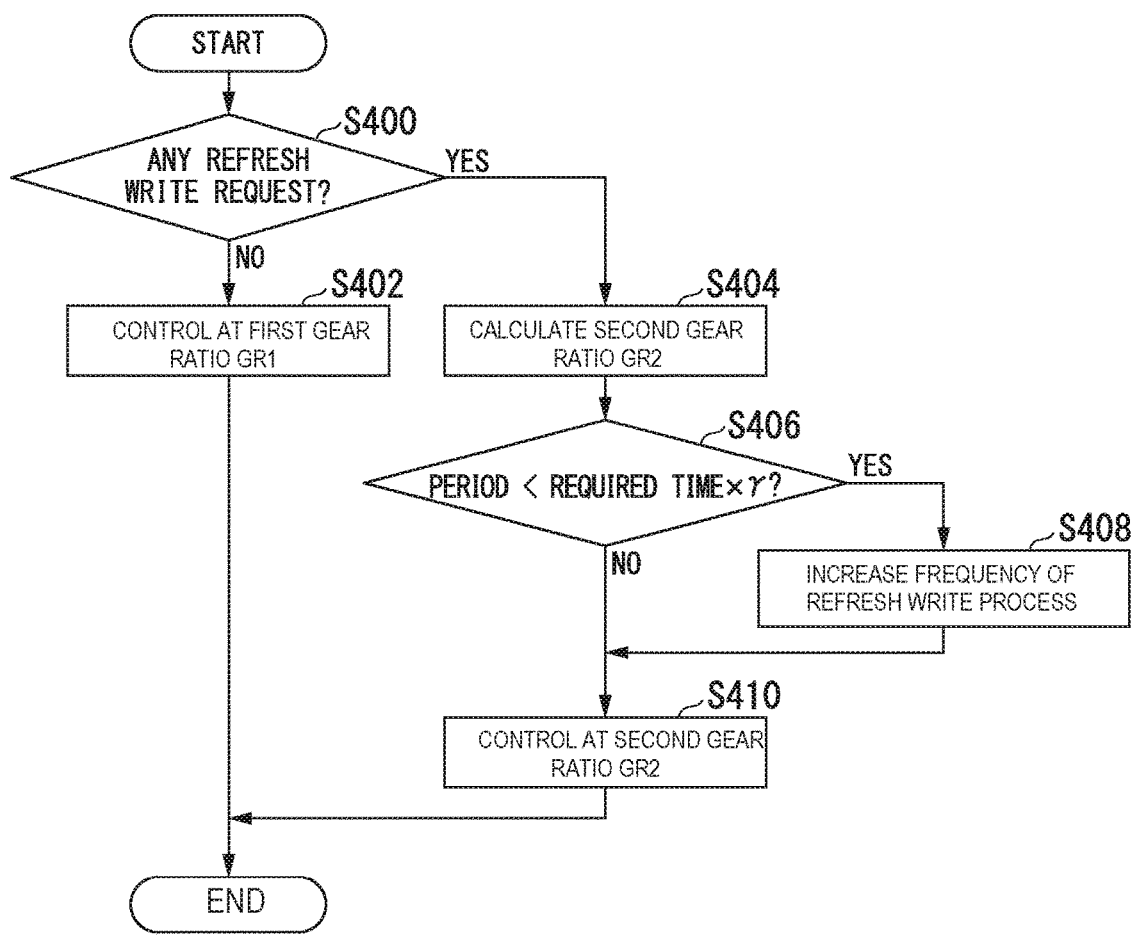
FIG. 13 illustrates a flowchart of a process executed by a control device according to a fourth embodiment.

FIG. 13 illustrates an example of the flowchart of the process executed by the gear ratio control section 33 according to the fourth embodiment.

First, based on a report from the block management section 31, the gear ratio control section 33 determines whether or not there is any refresh write request (S400). When it is determined that there is no refresh write request (No in S400), the gear ratio control section 33 controls the data access section 32 at the first gear ratio GR1 (S402).

On the other hand, when it is determined that there is a refresh write request (Yes in S400), the calculation unit 331 calculates the second gear ratio GR2 (S404) and the gear ratio control section 33 determines whether or not the period of the refresh write processes is less than the required time of the refresh write process multiplied by γ (S406). γ is a numerical value which is less than 1, for example. When it is determined that the occurrence period is less than the required time multiplied by γ (Yes in S406), the gear ratio control section 33 increases the frequency of the refresh write process (S408). The process of increasing the frequency of the refresh write process may be the same as that in the second embodiment. Then, the gear ratio control section 33 controls the data access section 32 at the second gear ratio GR2 (S410) to complete the process shown. On the other hand, when it is determined that the occurrence period is not less than the required time multiplied by γ (No in S406), the gear ratio control section 33 carries out S410 without carrying out S408.

In other words, when there is a large number of the non-executed refresh write processes, the frequency of the host write temporarily decreases such that it is lower than the performance reduction rate. However, the above-described control enables the refresh write process to be completed in the meantime and the data storage device 1 to be rapidly brought back to an appropriate state.

According to the above-described fourth embodiment, in addition to the same advantage as that in the first embodiment, the frequency of the refresh write processes is managed to prevent an excessive number of refresh write processes from being non-executed. As a result, according to the fourth embodiment, the frequency of carrying out the refresh write process is adjusted based on the frequency and the required time of the refresh write process, which leads to a more flexible process.

(Fifth Embodiment)

Figure 14:
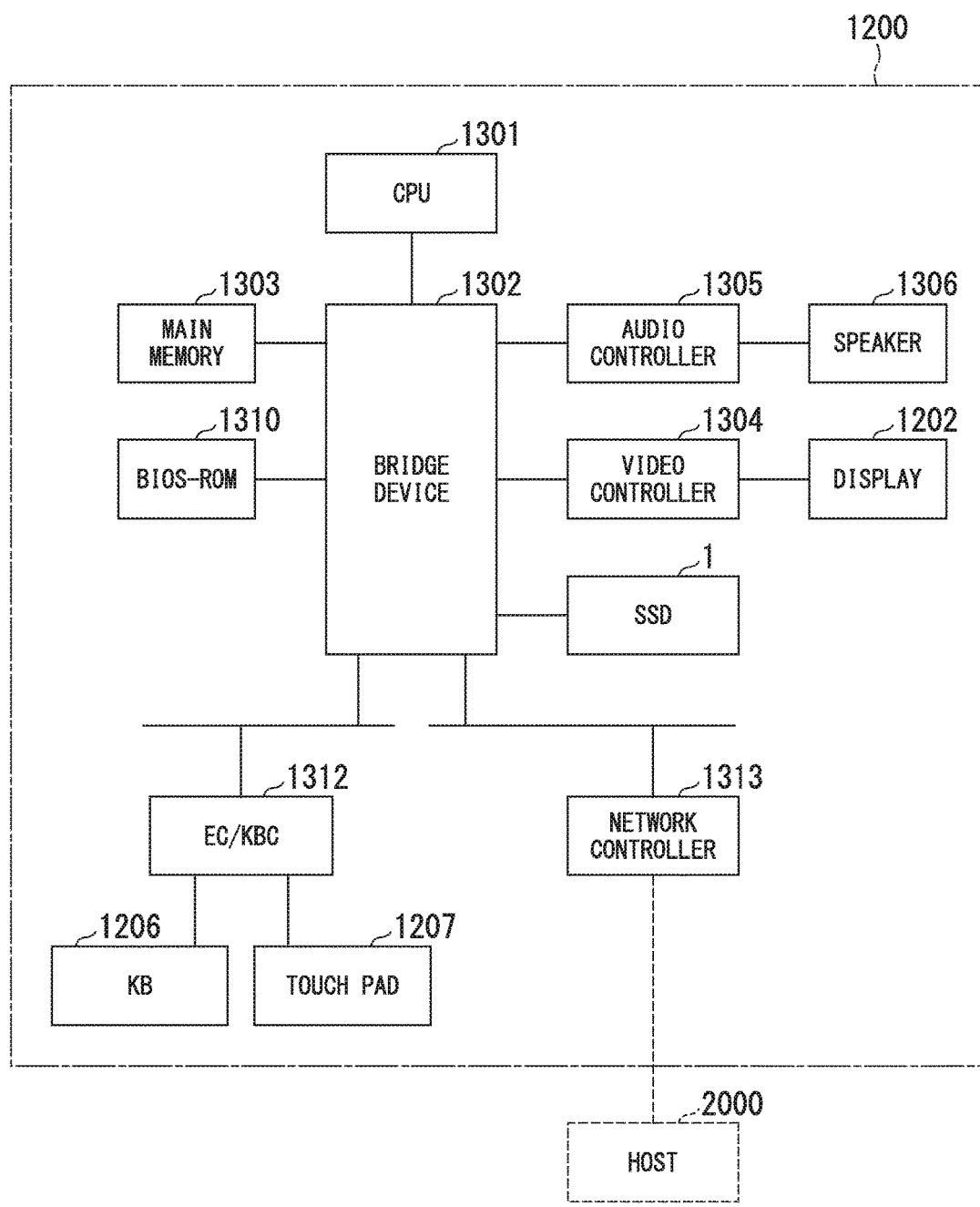
FIG. 14 illustrates a personal computer including the data storage device according to embodiments.

FIG. 14 illustrates an example of a personal computer including the data storage device (SSD) 1 according to one or more of the first to fourth embodiments. A personal computer 1200 includes a display 1202, a keyboard (KB) 1206, and a touch pad 1207 which is a pointing device. The personal computer 1200 further includes a CPU 1301, a bridge device 1302, a main memory 1303, a video controller 1304, an audio controller 1305, a speaker 1306, a BIOS-ROM 1310, the data storage device 1, an embedded controller/keyboard controller ID (EC/KBC) 1312, and a network controller 1313.

The CPU 1301 executes various programs including an operating system (OS), which is loaded to the main memory 1303 from the data storage device 1, etc., to cause the personal computer 1200 to carry out various processes. The CPU 1301 also carries out a process on the BIOS (basic input output system) stored in the BIOS-ROM 1310.

The bridge device 1302 includes an interface which accommodates a local bus of the CPU 1301, an interface which accommodates various buses to which various peripheral devices are connected, and an interface of the BIOS-ROM 1310 and the main controller of the main memory 1303. The main memory 1303 temporarily stores various programs and data and functions as a work area of the CPU 1301.

The bridge device 1302 communicates with the video controller 1304, the audio controller 1305, the EC/KBC 1312 and the network controller 1313, which are peripheral devices. The video controller 1304 controls displaying of the display 1202. The audio controller 1305 controls sound output from the speaker 1306. The EC/KBC 1312 includes an embedded controller (not shown) which manages power such as a power storage amount of a battery (not shown); and a keyboard controller (not shown) which controls the keyboard (KB) 1206 and the touch pad 1207. The EC/KBC 1312 detects an operation of a power button (not shown) to control the power supply state of the personal computer 1200 in accordance with detected results. The network controller 1313 communicates with a host 2000.

The bridge device 1302 controls the data storage device 1 via the SATA interface. Various programs and data are stored in the data storage device 1. The personal computer 1200 reads the data from the data storage device 1 and writes the data into the data storage device 1 in units of sectors. The personal computer 1200 supplies various commands such as a write command, a read command, a flash command, etc., via an SATA interface (I/F).

The personal computer 1200 including the data storage device 1 may communicate with a different host device 2000 (below abbreviated as the host) via the network controller 1313. The host 2000 is, for example, a different personal computer, a server device, an image recording device, etc., for example. The image recording device includes a mobile terminal having an imaging device such as a still camera, a video camera, etc., a desktop video server, etc. Here, the personal computer 1200 (the data storage device 1) is used as an external storage device of the host 2000 to cause the personal computer 1200 to function as a data storage device. In this case, the CPU 1301, the network controller 1313, or other functional devices of the personal computer 1200 may execute all or at least some of the processes executed by the individual functional devices of the SSD controller 10 of the SSD1 according to the first to fourth embodiments in place of the individual functional devices of the SSD controller 10. Even when a data write request is received from the host 2000, the above-described personal computer 1200 can rapidly respond to the data write request of the host 2000 regardless of the refresh write process carried out on the NAND 60 in the data storage device 1.

According to at least one embodiment described above, the host I/F 20 is connected to the host H. The NANDC 50 is connected to the NAND 60. The main controller 30 controls recording of data into the NAND 60 via the NANDC 60. The main controller 30 executes a refresh write process, a host write process, and a garbage collection process. The refresh write process is, for example, a process of writing, based on a condition which is different from the storage density of valid data sets stored in a block, at least all the valid data sets of data stored in a block to be a unit for rewriting the data of the NAND 60 into a different block. The host write process is a process of writing data from the host H that are received via the host I/F 20 into the NAND 60. The garbage collection process is a process of, based on the storage density of valid data stored in at least one block included in the plurality of the memory regions in the NAND 60, selecting valid data within at least one first block included in the plurality of blocks to move the selected result to a second block and release the first block. The main controller 30 calculates a first gear ratio GR1 which corresponds to the execution ratio of the host write process with respect to the garbage collection process when the refresh write process is not carried out; and a second gear ratio GR2 which corresponds to the execution ratio of the refresh write process, the host write process, and the refresh write process when the refresh write process is carried out. When the refresh write process is not carried out, the main controller 30 adjusts the execution frequency of the host write process with respect to the garbage collection process to the frequency corresponding to the first gear ratio GR1. When the refresh write process is carried out, the main controller 30 adjusts at least the execution frequency of the refresh write process to the execution frequency corresponding to the second gear ratio GR2. The above-described embodiments make it possible to restrict continuously carrying out the refresh write process when the data storage device 1 accepted the data write request from a host. This makes it possible for the data storage device 1 to rapidly respond to the data write request of the host.

For example, a method which designates the host write proportion that is described in the data storage device of an individual embodiment may be appropriately combined with a method described in the other embodiments. The above-described individual data storage device may perform control in accordance with the certain host write proportion until the number of blocks which need the refresh write process reaches the predetermined number, and may increase the gear ratio or the refresh frequency not in accordance with the certain host write proportion if the number of blocks exceeds the predetermined number.

The gear ratio control section 33 may calculate the above-described first gear ratio GR1 and second gear ratio GR2 to control the calculated gear ratios to be particular gear ratios.

The above-described first gear ratio GR1 and second gear ratio GR2 may be defined as follows. For example, the first gear ratio GR1 may be defined as a ratio of the total of the number of times or the frequency of the read process and the write process based on requests from the host H with respect to the total of the number of times or the frequency of the read process and the write process based on requests from the host H and the garbage collection process. Moreover, the second gear ratio GR2 may be defined as a ratio of the number of times or the frequency of the read process and the write process based on requests from the host H with respect to the total of the number of times or the frequency of the read process and the write process based on requests from the host H, the garbage collection process, and the refresh write process, etc.

While certain embodiments have been described, these embodiments have been presented by way of example only, and are not intended to limit the scope of the inventions. Indeed, the novel embodiments described herein may be embodied in a variety of other forms: furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller, comprising:
   a host interface;
   a memory interface; and
   a controller configured to control the memory interface to output data to a non-volatile semiconductor memory for writing therein, the data output to the non-volatile semiconductor memory including first data that the host interface received from a host, second data that the memory interface received from the non-volatile semiconductor memory for memory refresh, and third data that the memory interface received from the non-volatile semiconductor memory for garbage collection, wherein
   when the controller does not carry out the memory refresh, the controller adjusts a ratio of the first data with respect to a total of the first data and the third data to be a first value, and
   when the controller carries out the memory refresh, the controller calculates a second value based on a value of the ratio of the first data with respect to the total of the first data and the third data, and adjusts a ratio of the first data with respect to a total of the first data, the second data,. and the third data to be the second value that is different from the first value, and wherein
   the controller carries out the memory refresh in response to a read error and non-uniformity of write times among blocks of the non-volatile semiconductor memory, and
   the controller adjusts the second value when the memory refresh is carried out in response to the read error.

2. The memory controller according to claim 1, wherein the second value is smaller than the first value.

3. The memory controller according to claim 2, wherein the second value is smaller than the first value by a certain proportion.

4. The memory controller according to claim 3, wherein the controller receives the certain proportion from the host through the host interface.

5. The memory controller according to claim 1, wherein the adjusted second value is smaller than the non-adjusted second value.

6. The memory controller according to claim 1, wherein the controller is further configured to select one or more target blocks of the memory refresh, and adjust the second value based on a number of target blocks for which the memory refresh has not been carried out.

7. The memory controller according to claim 1, wherein the controller is further configured to calculate an average period at which the memory refresh is carried out and an average time that is taken for each memory refresh, and adjust the second value based on the calculated average period and the calculated average time.

8. A storage device, comprising:
   a non-volatile semiconductor memory;
   a host interface; and
   a controller configured to issue write command and write data to the non-volatile semiconductor memory, the write data including first data that the host interface received from a host, second data that are read out from the non-volatile semiconductor memory for memory refresh, and third data that are read out from the non-volatile semiconductor memory for garbage collection, wherein
   when the controller does not carry out the memory refresh, the controller adjusts a ratio of the first data with respect to a total of the first data and the third data to be a first value, and
   when the controller carries out the memory refresh, the controller calculates a second value based on a value of the ratio of the first data with respect to the total of the first data and the third data, and adjusts a ratio of the first data with respect to a total of the first data, the second data, and the third data to be the second value that is different from the first value, and wherein
   the controller carries out the memory refresh in response to a read error and non-uniformity of write times among blocks of the non-volatile semiconductor memory, and
   the controller adjusts the second value when the memory refresh is carried out in response to the read error.

9. The storage device according to claim 8, wherein the second value is smaller than the first value.

10. The storage device according to claim 9, wherein the second value is smaller than the first value by a certain proportion.

11. The storage device according to claim 10, wherein the controller receives the certain proportion from the host through the host interface.

12. The storage device according to claim 8, wherein the adjusted second value is smaller than the non-adjusted second value.

13. The storage device according to claim 8, wherein the controller is further configured to select one or more target blocks of the memory refresh, and adjust the second value based on a number of target blocks for which the memory refresh has not been carried out.

14. The storage device according to claim 8, wherein the controller is further configured to calculate an average period at which the memory refresh is carried out and an average time that is taken for each memory refresh, and adjust the second value based on the average period and the average time.

15. A memory control method, comprising:
    tracking amount of first data, second data, and third data, which are data written in a non-volatile semiconductor memory, wherein the first data are write data received from a host, the second data are write data read out from the non-volatile semiconductor memory for memory refresh, and the third data are write data that are read out from the non-volatile semiconductor memory for garbage collection;

determining whether to carry out memory refresh based on whether or not a read error occurred and whether or not non-uniformity of write times among blocks of the non-volatile semiconductor memory reaches a predetermined level;

when the memory refresh is determined to be not carried out, writing the first data and the second data, so that a ratio of the first data with respect to a total of the first data and the third data is a first value; and when the memory refresh is determined to be carried out, calculating a second value based on a value of the ratio of the first data with respect to the total of the first data and the third data, and writing the first data, the second data, and third data, so that a ratio of the first data with respect to a total of the first data, the second data, and the third data is the second value that is different from the first value, wherein the second value is adjusted when the memory refresh is determined to be carried out based on occurrence of the read error.

16. The memory control method according to claim 15, wherein the second value is smaller than the first value.

17. The memory control method according to claim 15, further comprising:

adjusting the second value based on a number of target blocks that are selected for the memory refresh and for which the memory refresh has not been carried out.

* * * * *